United States Patent
Li

(10) Patent No.: US 9,273,567 B2
(45) Date of Patent: *Mar. 1, 2016

(54) COATING, COATING LAYER SYSTEM, COATED SUPERALLOY COMPONENT

(71) Applicant: Siemens Aktiengesellschaft, Munich (DE)

(72) Inventor: Xin-Hai Li, Linkoping (SE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/348,605

(22) PCT Filed: Sep. 18, 2012

(86) PCT No.: PCT/EP2012/068303
§ 371 (c)(1),
(2) Date: Mar. 30, 2014

(87) PCT Pub. No.: WO2013/056934
PCT Pub. Date: Apr. 25, 2013

(65) Prior Publication Data
US 2014/0255726 A1    Sep. 11, 2014

(30) Foreign Application Priority Data
Oct. 20, 2011    (EP) .................... 11185990

(51) Int. Cl.
*C23C 30/00*    (2006.01)
*C23C 28/00*    (2006.01)
(Continued)

(52) U.S. Cl.
CPC .............. *F01D 25/005* (2013.01); *C22C 19/00* (2013.01); *C22C 19/03* (2013.01); *C22C 19/055* (2013.01);
(Continued)

(58) Field of Classification Search
CPC .... B32B 15/04; B32B 15/20; B32B 2603/00; C23C 28/00; C23C 28/022; C23C 28/042; C23C 28/3215; C23C 4/085; C23C 30/00; C23C 30/005; C23C 28/345; C23C 28/3455; C22C 19/00; C22C 19/007; C22C 19/055; C22C 19/056; C22C 19/03; C22C 19/05; C22C 19/07; C22C 19/051; C22C 30/00; Y10T 428/12; Y10T 428/12861; Y10T 428/12931; Y10T 428/12618; Y10T 428/12611; Y10T 428/12937; Y10T 428/12944; Y10T 428/12979; Y10T 428/264; Y10T 428/265
USPC ......... 428/632, 633, 678, 679, 680, 334, 335, 428/332
See application file for complete search history.

(56) References Cited

U.S. PATENT DOCUMENTS 6,280,857 B1 *   8/2001   Sommer et al. ............... 428/633
2004/0180233 A1   9/2004   Stamm
(Continued)

FOREIGN PATENT DOCUMENTS

EP    1783236 A1    5/2007
EP    2145969 A1    1/2010
(Continued)

OTHER PUBLICATIONS

Smialek, "Effect of Sulfur Removal on Al2O3 Scale Adhesion," Metallurgical Transactions A, vol. 22A, Mar. 1991, pp. 739-752.*
(Continued)

*Primary Examiner* — Michael E La Villa
(74) *Attorney, Agent, or Firm* — Beusse Wolter Sanks & Maire

(57) ABSTRACT

Coatings as may be used in a gas turbine are provided. A cobalt based coating may include 15 to 40 wt % nickel, 15 to 28 wt % chromium, 5 to 15 wt % aluminum, 0.05 to 1 wt % yttrium and/or at least one of elements from lanthanum series, 0.05 to 5 wt % ruthenium and/or molybdenum, 0 to 2 wt % iridium, 0 to 3 wt % silicon, 0 to 5 wt % tantalum, hafnium, unavoidable impurities, and a balance of cobalt. A nickel based coating may include 15 to 40 wt % cobalt, 10 to 25 wt % chromium, 5 to 15 wt % aluminum, 0.05 to 1 wt % yttrium and/or at least one of elements from lanthanum series, 0.05 to 8 wt % ruthenium or iron, 0 to 1 wt % iridium, 0.05 to 5 wt % molybdenum, 0 to 3 wt % silicon, 0 to 5 wt % tantalum, 0 to 2 wt % hafnium, unavoidable impurities, and a balance of nickel.

17 Claims, 1 Drawing Sheet

(51) Int. Cl.
*F01D 5/28* (2006.01)
*F01D 25/00* (2006.01)
*C22C 30/00* (2006.01)
*C22C 19/07* (2006.01)
*B32B 15/04* (2006.01)
*B32B 15/20* (2006.01)
*C22C 19/00* (2006.01)
*C22C 19/03* (2006.01)
*C22C 19/05* (2006.01)

(52) U.S. Cl.
CPC ............... *C22C 19/056* (2013.01); *C22C 19/07* (2013.01); *C22C 30/00* (2013.01); *C23C 28/3215* (2013.01); *C23C 28/345* (2013.01); *C23C 28/3455* (2013.01); *C23C 30/00* (2013.01); *F01D 5/288* (2013.01); *Y10T 428/12* (2015.01); *Y10T 428/12611* (2015.01); *Y10T 428/12618* (2015.01); *Y10T 428/12861* (2015.01); *Y10T 428/12931* (2015.01); *Y10T 428/12937* (2015.01); *Y10T 428/12944* (2015.01); *Y10T 428/12979* (2015.01); *Y10T 428/264* (2015.01); *Y10T 428/265* (2015.01)

(56) References Cited

U.S. PATENT DOCUMENTS

2009/0263675 A1  10/2009  Stamm
2010/0247950 A1  9/2010  Kasumi

FOREIGN PATENT DOCUMENTS

JP        2006-241514        *  9/2006
WO        2006025865   A2        3/2006

OTHER PUBLICATIONS

Machine Translation, Ogawa et al., JP 2006-241514, Sep. 2006.*

* cited by examiner

COATING, COATING LAYER SYSTEM, COATED SUPERALLOY COMPONENT

CROSS REFERENCE TO RELATED APPLICATIONS

This application is the US National Stage of International Application No. PCT/EP2012/068303 filed Sep. 18, 2012, and claims the benefit thereof. The International Application claims the benefit of European Application No. EP 11185990 filed Oct. 20, 2011. All of the applications are incorporated by reference herein in their entirety.

FIELD OF INVENTION

The invention relates to a coating, a coating layer system and a coated superalloy component preferably to be used in a gas turbine's hot gas path.

BACKGROUND OF INVENTION

When further increasing engine efficiency, output power, availability and reliability in the current gas turbine development, this effort is often limited by temperature capacity and lifetime of protective coatings for protection against hot corrosion and oxidation and bonding thermal barrier coating on the hot turbine components. The currently used coatings are so called MCrAlY coatings developed by major gas turbine manufactures. Most gas turbine manufactures use there proprietary coatings since commercially available coatings are much less effective.

The term MCrAlY coatings is widely applied, wherein M means cobalt or nickel or a mixture of cobalt and nickel. These coatings may be used as corrosion resistant overlays or as bond-coats for use with thermal barrier coatings. Since in the first and second stage of a gas turbine metal temperatures may exceed 850° C. two predominant corrosion mechanics have been identified to be accelerated. One is the high temperature oxidation occurring at temperatures above 950° C. and the other mechanism is the so called type-I-hot-corrosion-occurring at approximately 850° C. to 950° C.

During the last ten years the demand for coatings in gas turbines increased, which led to an increase in price of the coatings, which contain comparatively large amounts of rare earth or minor elements which's availability is increasingly tight.

Today's MCrAlY coatings rely very much on yttrium incorporation to have so called pegging and scavenge effects to increase oxidation and corrosion resistance of the coatings.

However, it has been recently found that the yttrium content in MCrAlY may not be optimized. Nijdam T J, Sloof W G. (Acta Materia/ia 2007; 55:5980) reported that yttrium oxide inclusions in the protective aluminum oxide scale on top of the MCrAlY provide fast oxygen diffusion routes and therefore accelerate oxidation of the coating.

Further Smialek J L, Jayne Q T, Schaeffer J C and Murphy W H (Thin Solid Films 1994; 253:285; Smialek J L; Metallurgical Transactions A. Physical Metallurgy and Material Science 1991; 22A:739) state that a high sulfur content of bigger than 10 ppm (parts per million) existed in the current MCrAlY layer shortening coating lifetime.

Typically ceramic coating(s) are used on a hot gas component of a gas turbine, for example turbine blades, combustors, transition ducts, sealing segments, and nozzle guide vanes, providing the components with thermal insulating or sealing functions. For the thermal insulating, the ceramic coatings are called thermal barrier coatings (TBC) which are characterized by a low thermal conductivity and typically consist of zirconia stabilized by yttria generally deposited by plasma spraying and electron beam physical vapor deposition on the substrate. Often a bond-coat is necessary to avoid exceeding residual stresses caused by different thermal expansion of the substrate and the ceramic thermal barrier coating(s). Most often the bond-coat is applied on the surface as a MCrAlY bond-coat.

SUMMARY OF INVENTION

It is one task of the invention to optimize the coating constitution, in order to achieve a good thermal stability of coating phase structures and a high mechanical durability.

It is another task to optimize the content and combination of the rare earth and minor elements in coatings, in order to minimize growths of oxides on top of the coating and interdiffusion between coating and superalloy substrates which lead to a rapid consumption of the Al reservoir in coatings thereby coating lifetime.

It is still another task of the invention to avoid the implementation of sulfur in the coating system shortening the coating lifetime.

To overcome the technical limitations outlined above and as a reaction to the dramatic increase in price of rare earth elements a coating, a coating layer system and a coated superalloy component especially a blade, a vane, or a sealing segment of a gas turbine hot gas path are proposed according to the claims of the invention.

By introduction of other minor elements like ruthenium, iridium, molybdenum, silicon, hafnium, tantalum, and elements in lanthanum series the necessary amount of yttrium is significantly reduced, which efficiently minimize the negative effects of yttrium. The coating and coating system according to the invention can be characterized by the term MCrAlX alloy coating, wherein M stands for nickel or cobalt or both of these elements and X is a combination of minor elements such as yttrium, ruthenium, iridium, silicon, hafnium, or tantalum and others.

The new coating alloy according to the invention performs in a very efficient way because the introduction of ruthenium, molybdenum, or/and iridium reduces the diffusion rate of aluminum and forms a diffusion barrier to minimize the interdiffusion between the MCrAlX coating and the substrate.

A preferred embodiment of the coating layer provides a reduction of the sulfur content to Below 10 ppm which increases the coating lifetime.

Preferably the coating is applied in a thickness in the range of 30 to 800 μm depending on the type of application and the application method. Preferred application methods are thermal spraying in air, thermal spraying in vacuum, thermal spraying in protected atmosphere, physical vapor deposition, and plating on nickel or cobalt based superalloys.

The coating can be applied as a single coating or as a bond-coat underlying an adherent ceramic coating(s) compensating different thermal expansions between the substrate and the ceramic coating(s) on the one hand and improving especially the oxidation resistance of the superalloy component.

Summarizing this invention results in MCrAlX (as defined above) coatings with a higher temperature capacity and longer lifetime compared to conventional MCrAlY coatings.

BRIEF DESCRIPTION OF THE DRAWINGS

The following relates to preferred embodiments of the invention with reference to drawings illustrating the currently best mode of putting the invention into practice.

DETAILED DESCRIPTION OF INVENTION

Figure 1:
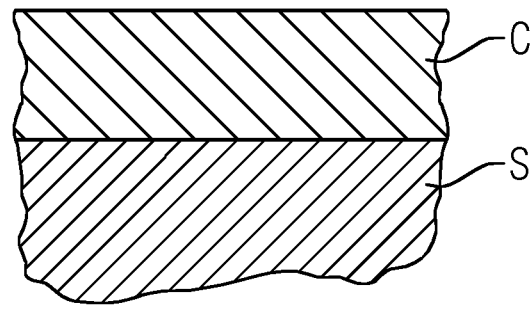
FIG. 1 shows a first embodiment of the invention, wherein a coating embodying aspects of the invention is applied as a single layer to a substrate.

FIG. 1 shows a substrate as covered with an adherent coating C embodying aspects of the present invention as described below. The coating C is applied on a substrate by way of thermal spraying in air or vacuum or protected atmosphere or by way of physical vapor deposition or by way of plating. The substrate is part of a superalloy gas turbine component, for example a gas turbine vane or a gas turbine blade or a combustor part.

A cobalt based coating may comprise: 15 to 40 wt % nickel, 15 to 28 wt % chromium, 5 to 15 wt % aluminum, 0.05 to 1 wt % yttrium and/or at least one element from lanthanum series, 0.05 to 8 wt % ruthenium and/or molybdenum, 0 to 2 wt % iridium, 0 to 3 wt % silicon, 0 to 5 wt % tantalum, 0 to 2 wt % hafnium, unavoidable impurities, and a balance of cobalt.

In one embodiment the coating may contain 0.1 to 0.6 weight percent of silicon; in another embodiment the coating may contain 0.3 to 0.7 weight percent of tantalum; and in yet another embodiment the coating may contain 0.1 to 0.5 weight percent of hafnium.

Figure 2:
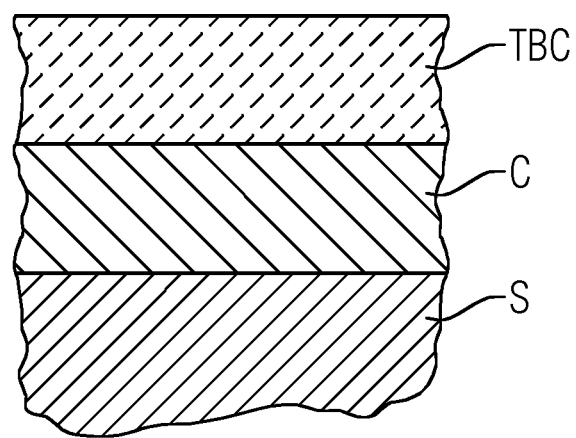
FIG. 2 shows a second embodiment of the invention, wherein the coating is an intermediate layer of a coating layer system to be applied on a substrate.

FIG. 2 shows a substrate covered at least partially by a layer system comprising a coating as a lower layer directly provided on the substrate, which coating C is an intermediate layer provided as a bond-coat for the adherent ceramic coating(s) TBC. The coating C has the composition outlined above. The substrate is a blade or a vane or a combustor part or a sealing segment of a gas turbine exposed to the hot gas.

In one embodiment, the ceramic coating(s) may include at least 70 wt % zirconium oxide and is stabilized by at least one of yttrium oxide, magnesium oxide, and oxides of elements in lanthanum series. The bond-coat compensates different thermal expansion between the ceramic coating(s) and the superalloy substrate.

In one embodiment, a coated superalloy component may comprise a substrate article formed of a superalloy and an adherent coating, such as the cobalt based coating described above; or an adherent coating layer system, such as the ceramic coating(s) described above, covering at least a portion of the substrate article's surface.

The invention claimed is:

1. A cobalt based coating consisting of:

| | | |
|---|---|---|
| 15 to 40 | weight percent of | nickel, |
| 15 to 28 | weight percent of | chromium, |
| 5 to 15 | weight percent of | aluminum, |
| 0.05 to 1 | combined weight percent of | yttrium and/or at least one element from lanthanum series, |
| 0.05 to 8 | combined weight percent of | ruthenium and molybdenum wherein both ruthenium and molybdenum are present, |
| 0 to 2 | weight percent of | iridium, |
| 0 to 3 | weight percent of | silicon, |
| 0 to 5 | weight percent of | tantalum, |
| 0 to 2 | weight percent of | hafnium, | all percentages relative to a total weight of the coating, unavoidable impurities, and a balance of cobalt.

2. The coating according to claim 1, containing 0.1 to 0.6 weight percent of silicon.

3. The coating according to claim 1, containing 0.3 to 0.7 weight percent of tantalum.

4. The coating according to claim 1, containing 0.1 to 0.5 weight percent of hafnium.

5. The coating according to claim 1, wherein a content of sulfur is reduced to below 10 ppm (parts per million) by weight.

6. The coating according to claim 1, wherein a thickness of the coating is between 30 and 800 μm.

7. A coating layer system comprising a lower first layer on a substrate and an adherent upper second layer, wherein the lower first layer is a coating according to claim 1 and the adherent upper second layer is a ceramic coating or multiple ceramic coatings.

8. The coating layer system according to claim 7, wherein each of the ceramic coatings includes
   zirconium dioxide
   and a stabilizer.

9. The coating layer system according to claim 8, wherein the stabilizer is at least one of yttrium oxide, magnesium oxide, and oxides of elements in lanthanum series.

10. A coated superalloy component comprising
   a substrate article formed of a superalloy and
   an adherent coating according to claim 1.

11. The coated superalloy component according to claim 10, wherein the superalloy component is a blade, a vane, or a sealing segment of a gas turbine's hot gas path.

12. A coated superalloy component comprising:
   a substrate article formed of a superalloy;
   a lower first layer on the substrate; and
   an adherent upper second layer on the lower first layer, wherein:
   the lower first layer is a coating according to claim 1
   the adherent second layer is a ceramic coating or multiple ceramic coatings; and
   each of the ceramic coatings include zirconium dioxide and a stabilizer.

13. The coating of claim 1, comprising greater than 0 weight percent and less than or equal to 2 weight percent of the iridium.

14. The coating of claim 1, wherein the 0.05 to 1 combined weight percent of yttrium and/or at least one element from lanthanum series comprises 0.05 to 1 weight percent of the at least one element from the lanthanum series.

15. A cobalt based coating consisting of
   15 to 40 weight percent of nickel,
   15 to 28 weight percent of chromium,
   5 to 15 weight percent of aluminum,
   0.05 to 1 combined weight percent of yttrium and/or at least one element from the lanthanum series,
   0.05 to 8 weight percent of molybdenum,
   greater than 0 and less than or equal to 2 weight percent of iridium,
   0 to 3 weight percent of silicon,
   0 to 5 weight percent of tantalum,
   0 to 2 weight percent of hafnium,
   unavoidable impurities, and
   the balance of the cobalt.

16. The coating of claim 15, wherein the 0.05 to 1 combined weight percent of yttrium and/or at least one element from the lanthanum series comprises 0.05 to 1 weight percent of the at least one element from the lanthanum series.

17. A cobalt based coating consisting of:
   15 to 40 weight percent of nickel,
   15 to 28 weight percent of chromium,
   5 to 15 weight percent of aluminum, 0.05 to 1 combined weight percent of yttrium and/or at least one element from the lanthanum series,
0.05 to 8 combined weight percent of at least molybdenum and optionally ruthenium,
greater than 0 and less than or equal to 2 weight percent of iridium,
0 to 3 weight percent of silicon,
0 to 5 weight percent of tantalum,
0 to 2 weight percent of hafnium,
all percentages relative to a total weight of the coating, and a balance of cobalt.

* * * * *